(12) United States Patent
Kashiwagi (10) Patent No.: US 11,560,107 B2
(45) Date of Patent: Jan. 24, 2023

(54) IMPACT-ABSORBING STRUCTURE (71) Applicant: HONDA MOTOR CO., LTD., Tokyo (JP)

(72) Inventor: Masakazu Kashiwagi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/381,482

(22) Filed: Jul. 21, 2021

(65) Prior Publication Data
US 2022/0032867 A1 Feb. 3, 2022

(30) Foreign Application Priority Data
Jul. 28, 2020 (JP) .............................. JP2020-127081

(51) Int. Cl.
*B60R 19/30* (2006.01)
*B60R 19/02* (2006.01)
*B60R 19/18* (2006.01)

(52) U.S. Cl.
CPC ............ *B60R 19/30* (2013.01); *B60R 19/023* (2013.01); *B60R 2019/186* (2013.01)

(58) Field of Classification Search
CPC ....... B60R 19/02; B60R 19/023; B60R 19/18; B60R 19/30; B60R 19/34
USPC ................................................. 293/132, 133
See application file for complete search history.

(56) References Cited

U.S. PATENT DOCUMENTS

| | | | |
|---|---|---|---|
| 4,586,739 A | 5/1986 | Loren et al. | |
| 4,613,177 A | 9/1986 | Loren et al. | |
| 4,616,866 A | 10/1986 | Loren et al. | |
| 4,635,984 A | 1/1987 | Loren et al. | |
| 4,652,031 A | 3/1987 | Loren et al. | |
| 4,722,563 A | 2/1988 | Loren et al. | |
| 6,308,999 B1 | 10/2001 | Tan et al. | |
| 6,983,964 B2 | 1/2006 | Murata et al. | |
| 7,533,912 B2 * | 5/2009 | Frederick | B60R 19/18 293/142 |
| 10,668,881 B2 * | 6/2020 | Yoshida | B60R 21/00 |

(Continued)

FOREIGN PATENT DOCUMENTS

DE 102011113474 A1 * 3/2013 ............. B60R 19/18
JP S60-229844 A 11/1985

(Continued)

OTHER PUBLICATIONS

Office Action received in corresponding Japanese application No. 2020-127081 dated Mar. 1, 2022 with English translation (6 pages).

*Primary Examiner* — Jason S Daniels
(74) *Attorney, Agent, or Firm* — Rankin, Hill & Clark LLP (57) ABSTRACT

An impact-absorbing structure includes: a bumper face; a bumper beam; and an impact-absorbing member interposed to be compressively deformed between the exterior member and the movable-body-side rigid member. The movable-body-side rigid member, in an up-and-down direction of the movable-body-side rigid member, includes: a plurality of recesses recessed toward the movable body; and a protrusion protruding forward the movable body to be formed between the plurality of recesses. The plurality of recesses each have a vertical width gradually tapering toward the movable body, and the impact-absorbing member is fitted into at least two of the plurality of recesses.

7 Claims, 5 Drawing Sheets

(56) References Cited

U.S. PATENT DOCUMENTS

| | | | |
|---|---|---|---|
| 2003/0020290 A1* | 1/2003 | Cherry | B60R 19/18 |
| | | | 293/120 |
| 2004/0124622 A1* | 7/2004 | Schonebeck | B60R 19/22 |
| | | | 280/748 |
| 2006/0028037 A1* | 2/2006 | Kashiwagi | B60R 19/18 |
| | | | 293/120 |
| 2006/0131899 A1* | 6/2006 | Adachi | B60R 19/18 |
| | | | 293/109 |
| 2010/0123337 A1 | 5/2010 | Tamura et al. | |
| 2010/0207426 A1 | 8/2010 | Tsuruta et al. | |
| 2016/0257271 A1 | 9/2016 | Tomita | |
| 2018/0272971 A1* | 9/2018 | Syvertsen | B60R 21/0136 |
| 2019/0039658 A1 | 2/2019 | Yokoi et al. | |

FOREIGN PATENT DOCUMENTS

| | | |
|---|---|---|
| JP | 2004-322861 A | 11/2004 |
| JP | 2007-137114 A | 6/2007 |
| JP | 2007-203773 A | 8/2007 |
| JP | 2010-120418 A | 6/2010 |
| JP | 2014-177159 A | 9/2014 |
| JP | 2016-155411 A | 9/2016 |
| JP | 2016-159855 A | 9/2016 |
| JP | 2019-026168 A | 2/2019 |
| WO | 2009038088 A1 | 3/2009 |

* cited by examiner

IMPACT-ABSORBING STRUCTURE

CROSS-REFERENCE TO RELATED APPLICATION

The present application claims the benefit of priority to Japanese Patent Application No. 2020-127081 filed on Jul. 28, 2020, the disclosures of all of which are hereby incorporated by reference in their entireties.

BACKGROUND

Technical Field

The present invention relates to an impact-absorbing structure.

Related Art

Conventionally, as an impact-absorbing structure, there is a bumper structure including an exterior member, a bumper beam, and an impact-absorbing member made of a foam body arranged between the exterior member and the bumper beam (for example, JP 2004-322861 A). The bumper beam of this bumper structure has step portions to be engaged with the impact-absorbing member. Specifically, the step portions are formed stepwise at right angles at the corresponding ends in the up-and-down direction of the bumper beam, to have a rectangular cross-sectional groove extending in the vehicular width direction in the middle in the up-and-down direction of the bumper beam.

In such a bumper structure, when the impact-absorbing member receives a collision load through the exterior member, the impact-absorbing member is distorted in accordance with a level of the collision load and the impact-absorbing member is housed in the step portions of the bumper beam.

According to such a bumper structure, an amount of distortion of the impact-absorbing member at the time of collision is suppressed from exceeding a maximum amount of distortion for maintaining restoration. Thus, the bumper structure has vehicle-body protection performance at the time of collision with an object and pedestrian protection performance at the time of collision with a person.

SUMMARY

However, in a conventional bumper structure (for example, see JP 2004-322861 A), a fixing force of the impact-absorbing member engaged with the step portions may be insufficient. As a result, the impact-absorbing member may come off from the bumper beam after the exterior member is attached to a vehicle body. Thus, when the impact-absorbing member is engaged with the step portions, an adhesive or a fixing member such as a fastener may be needed between the step portions and the impact-absorbing member.

An object of the present invention is to provide an impact-absorbing structure capable of stably fixing an impact-absorbing member without a need of a fixing member separately, which is different from a conventional impact-absorbing structure.

An impact-absorbing structure according to an embodiment of the present invention includes: an exterior member for a movable body; a movable-body-side rigid member; and an impact-absorbing member interposed to be compressively deformed between the exterior member and the movable-body-side rigid member. The movable-body-side rigid member, in an up-and-down direction of the movable-body-side rigid member, includes: a plurality of recesses recessed toward the movable body; and a protrusion protruding forward the movable body to be formed between the plurality of recesses. The plurality of recesses each have a vertical width gradually tapering toward the movable body, and the impact-absorbing member is fitted into at least two of the plurality of recesses.

According to the present invention, which is different from a conventional impact-absorbing structure, provides an impact-absorbing structure to stably fix an impact-absorbing member without a need of a fixing member separately.

DETAILED DESCRIPTION

Next, a description is given of an impact-absorbing structure of an embodiment (present embodiment) of the present invention in detail.

The impact-absorbing structure of the present embodiment is described to be used as a front bumper structure of a vehicle. The present invention, however, is not limited thereto, and thus is applicable not only to a rear bumper structure of the vehicle but also to the impact-absorbing structures for other movable bodies such as ships.

Figure 1:
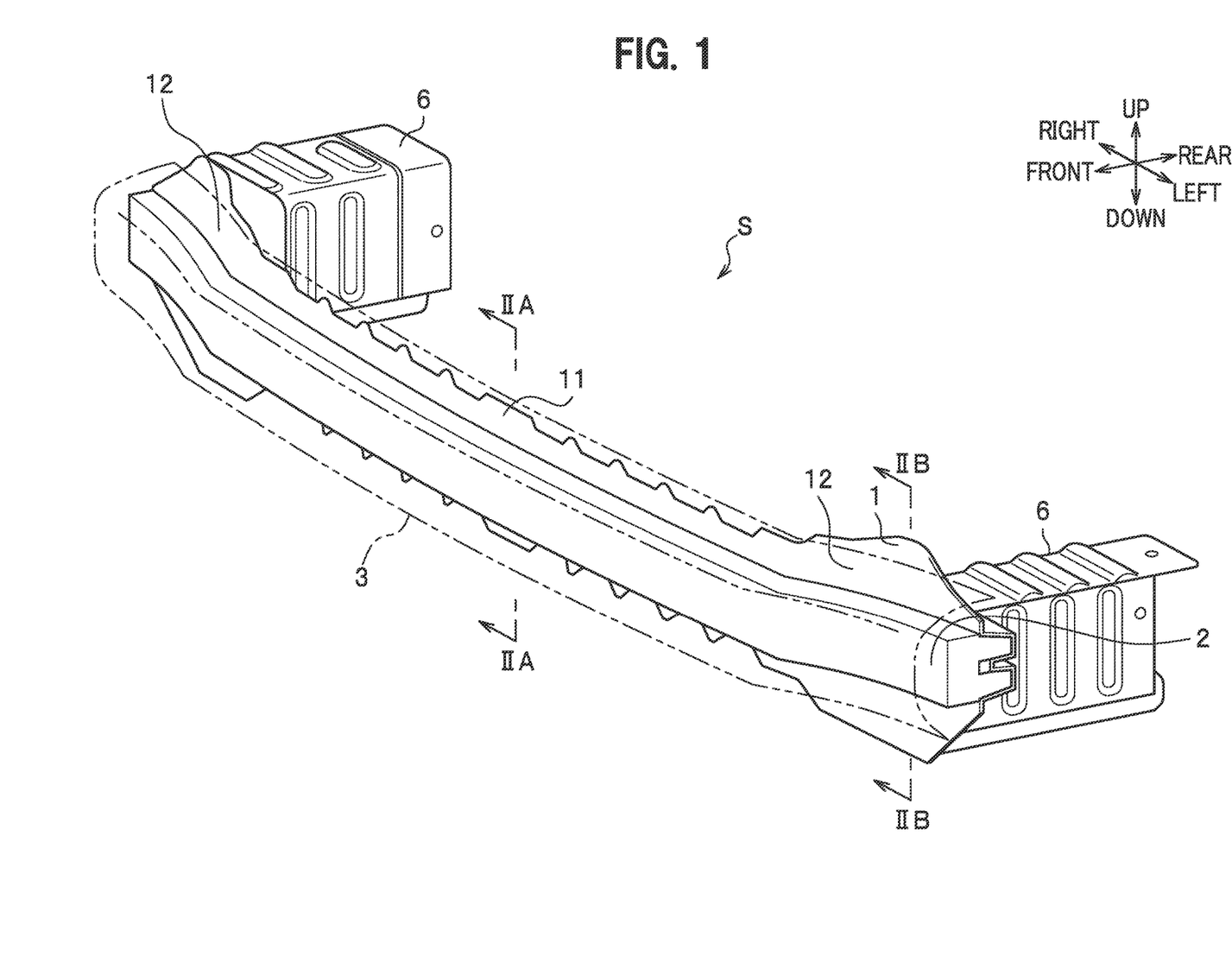
FIG. 1 is a partially enlarged perspective view of an impact-absorbing structure according to an embodiment.

Note that, in the following description, front, rear, left, right, up, and down directions are on the basis of front, rear, left, right, up, and down directions as illustrated in FIG. 1.

Figure 2A:
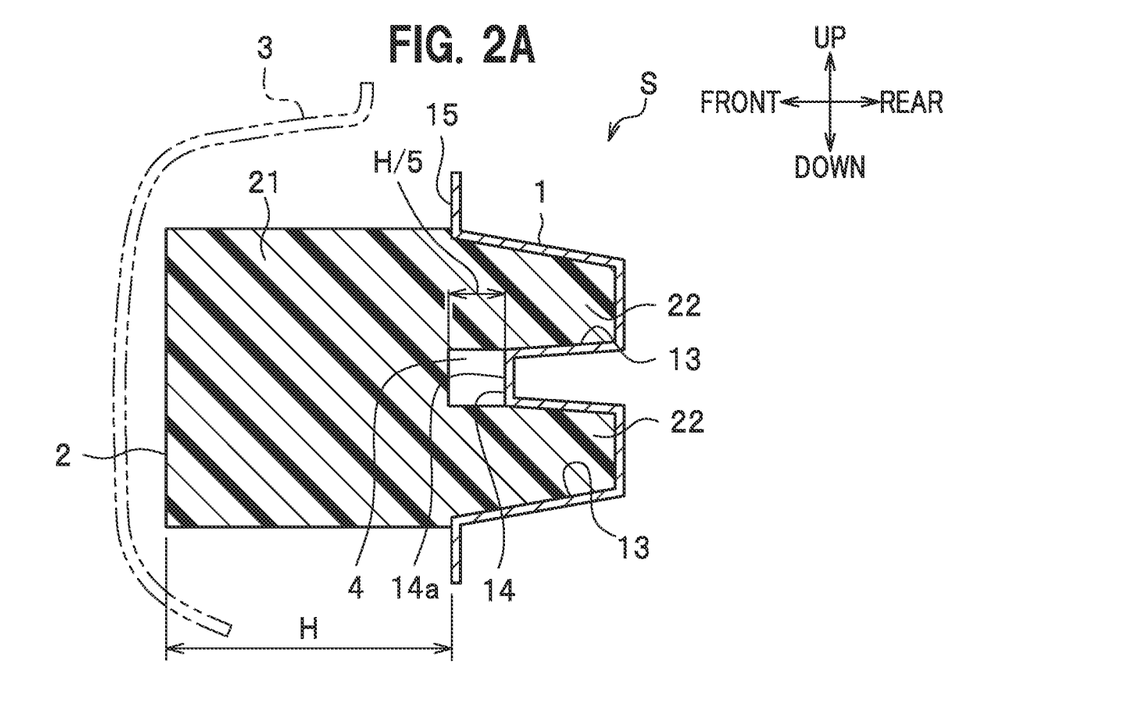
FIG. 2A is a cross-sectional view taken along a line IIA-IIA of FIG. 1.
Figure 2B:
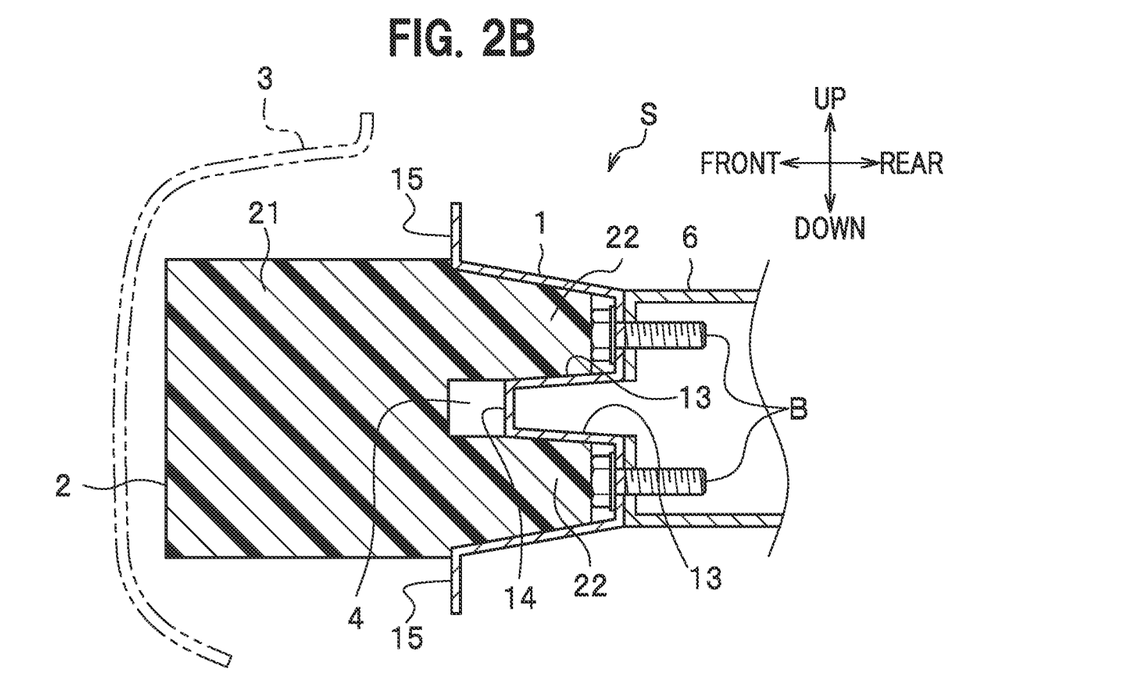
FIG. 2B is a cross-sectional view taken along a line IIB-IIB of FIG. 1.

FIG. 1 is a partially enlarged perspective view of a front bumper structure S (hereinafter simply referred to as bumper structure S) according to the present embodiment. FIG. 2A is a cross-sectional view taken along a line IIA-IIA of FIG. 1. FIG. 2B is a cross-sectional view taken along a line IIB-IIB of FIG. 1.

As illustrated in FIG. 1, the bumper structure of the present embodiment includes a bumper beam 1, an impact-absorbing member 2, and a bumper face 3, from a side closer to a vehicle main body (side closer to the movable body) to a side farther from the vehicle main body (side farther from the movable body). Note that the bumper beam 1 corresponds to a "movable-body-side rigid member" in the appended claims. The bumper face 3 corresponds to an "exterior member" in the appended claims.

Hereinafter, descriptions are given of the bumper beam 1, the impact-absorbing member 2, and the bumper face 3 in this order.

As illustrated in FIG. 1, the bumper beam 1 is disposed across front ends of front side frames 6 that are located on the left and right of a front portion of the vehicle body to extend in the front-and-rear direction. The bumper beam 1 extends in a vehicular width direction (left-and-right direction in FIG. 1). Note that the bumper beam 1 in the present embodiment may be attached to the front ends of the front side frames 6 through a bumper beam extension (not shown).

The bumper beam 1 is provided with a beam portion 11 and slant portions 12. The beam portion 11 extends along a vehicle-body width direction at a central portion of the bumper beam 1 in the vehicle-body width direction. The slant portions 12 are displaced rearward and slant as extending further outward in the vehicle-body width direction from the corresponding ends of the beam portion 11.

The beam portion 11 is curved such that its central portion protrudes slightly forward as viewed from above the vehicle body. Thus, the bumper beam 1 as a whole has a substantially arcuate shape protruding forward.

As illustrated in FIG. 2A, which is a cross-sectional view of the central portion in the vehicle-body width direction, the bumper beam 1 includes a pair of upper and lower recesses 13 each having an opening on a front side and a bottom on a rear side. Although not illustrated, these recesses 13 are provided almost over the bumper beam 1 in the vehicular width direction, to serve as a pair of upper and lower grooves extending in the vehicular width direction on the front side of the bumper beam 1.

Note that, in the present embodiment, a plurality of recesses 13 may be formed in the up-and-down direction, and three or more recesses may be formed.

As illustrated in FIG. 2A, each of the recesses 13 has a tapered shape in which inner walls are inclined toward the rear of the vehicle body such that a vertical width therebetween is gradually tapered, in other words, "toward the rear of the movable body" as claimed in the appended claims. A bottom face on the rear side of each recess 13 is flat in the up-and-down direction.

The bumper beam 1 includes a face portion 15 on the upper side of the upper recess 13 of the pair of recesses 13. The face portion 15 is continuous to the upper recess 13 so as to face in the front-and-rear direction of the vehicle body (front-and-rear direction in FIG. 2A). The bumper beam 1 includes another face portion 15 on the lower side of the lower recess 13 of the pair of recesses 13. The other face portion 15 is continuous to the lower recess 13 so as to face in the front-and-rear direction of the vehicle body (front-and-rear direction in FIG. 2A). Namely, the face portions 15 illustrated in FIG. 2A correspond to "face portions outside the recesses formed at outermost portions among the plurality of recesses in the up-and-down direction to face in the front-and-rear direction of the movable body, the face portion being adjacent to the recess" in the appended claims.

The bumper beam 1 further includes a protrusion 14 having a bottom on the front side and an opening on the rear side between the recesses 13 formed in the up-and-down direction. Although not illustrated, the protrusion 14 formed almost over the bumper beam 1 in the vehicular width direction serves as a rail body has a leading face 14a (see FIG. 2A) flat in the up-and-down direction on the front side of the protrusion 14, to extend in the vehicular width direction. Sidewalls respectively formed in the up-and-down direction of the rail body also serve as the inner walls of the grooves formed as the recesses 13.

The protrusion 14 as described above of the bumper beam 1 is formed closer to the rear of the vehicle body (closer to the rear of the movable body) than the face portions 15 continuous to the recesses 13. Namely, the leading face 14a of the protrusion 14 is behind the face portions 15.

As illustrated in FIG. 2B, the bumper beam 1 is fastened to the front end of the front side frame 6 with bolts B. Specifically, the respective bottom faces of the recesses 13 of the bumper beam 1 are fastened to the front end of the front side frame 6 with the pair of bolts B.

The bumper beam 1 in the present embodiment as described above is assumed to be a press-formed product of a steel plate.

Next, a description is given of the impact-absorbing member 2 (see FIG. 1).

As illustrated in FIG. 1, the impact-absorbing member 2 is arranged to extend in the vehicular width direction along the bumper beam 1 on the front side of the bumper beam 1.

The impact-absorbing member 2 is formed of a compressively-deformable foamed elastic resin as described below.

As illustrated in FIG. 2A, the impact-absorbing member 2 includes an impact-absorbing-member main body 21 at a front portion of the impact-absorbing member 2 and legs 22 extending rearward from the impact-absorbing-member main body 21. The legs 22 are fitted to fix into the corresponding recesses 13 of the bumper beam 1.

As illustrated in FIG. 2A, the impact-absorbing-member main body 21 has a substantially rectangular cross-sectional shape. Namely, as illustrated in FIG. 1, the impact-absorbing-member main body 21 has a rectangular prism shape that is elongated in the vehicular width direction.

The legs 22 are a pair of protrusions extending rearward from the impact-absorbing-member main body 21. As illustrated in FIG. 2A, the legs 22 are housed in the recesses 13 of the bumper beam 1, each having a trapezoidal shape along the tapered shape of the corresponding recess 13 in the cross-sectional view illustrated in FIG. 2A. The legs 22 in the present embodiment, however, are larger in cross-sectional shape than the recesses 13, before the impact-absorbing member 2 is assembled to the bumper beam 1.

Figure 3:
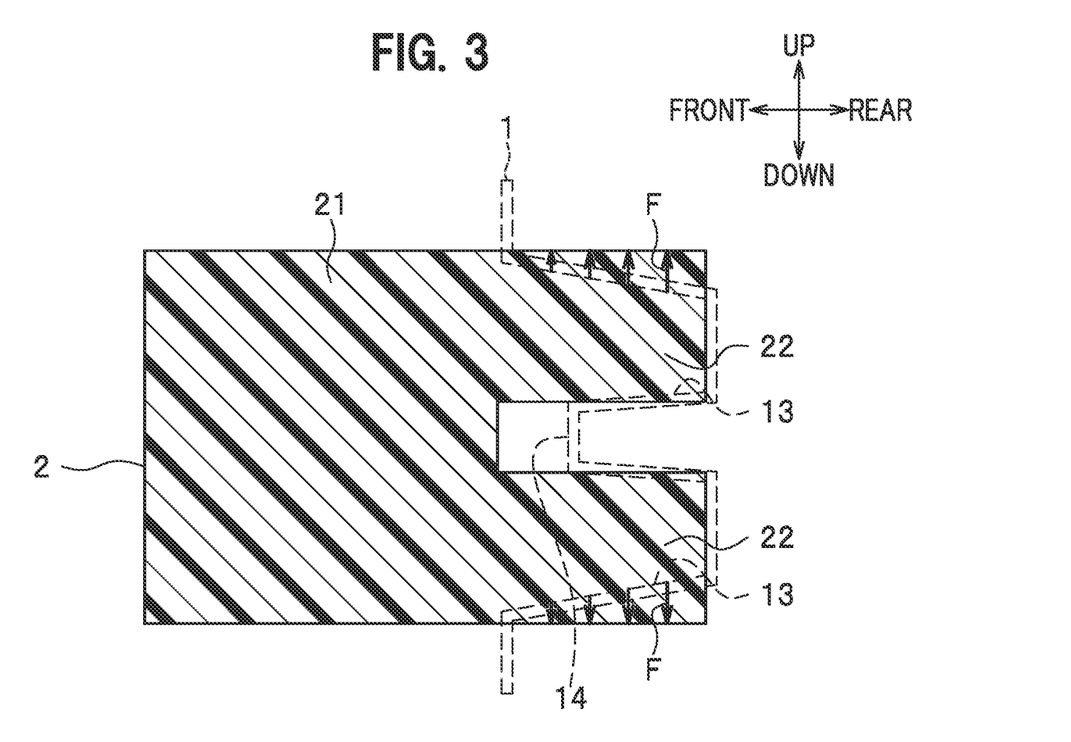
FIG. 3 is a cross-sectional view of the impact-absorbing member before being assembled to a bumper beam.

FIG. 3 is a cross-sectional view of the impact-absorbing member 2 before being assembled to the bumper beam 1, and corresponds to FIGS. 2A and 2B illustrating the impact-absorbing member 2 after being assembled to the bumper beam 1. Note that the bumper beam 1 in FIGS. 2A and 2B is indicated by a virtual line (dotted line) in FIG. 3.

In the cross-sectional view of the impact-absorbing member 2 illustrated in FIG. 3, the legs 22 of the impact-absorbing member 2 before being assembled to the bumper beam 1 each have a substantially constant vertical width from a base end as a root of the impact-absorbing-member main body 21 to a leading end extending rearward. The leading end of each leg 22 is equal to or slightly wider in vertical width than the opening of the corresponding recess 13 of the bumper beam 1.

As illustrated in FIG. 2A, when the legs 22 are fitted into the recesses 13 of the bumper beam 1, each leg 22 has a trapezoidal shape along the tapered shape of the corresponding recess 13 as described above. Namely, the legs 22 are compressed, each having a tapered shape toward the rear.

The shape of the legs 22 before being assembled to the bumper beam 1, however, is not limited thereto, as long as each leg 22 has a shape wider in vertical width than the corresponding recess 13. Therefore, each leg 22 before assembly may have, for example, a trapezoidal shape wider in vertical width than the corresponding recess 13.

As illustrated in FIG. 3, the legs 22 press the inner walls of the recesses 13 caused by a restoring force F of the impact-absorbing member 2 formed of the foamed elastic resin. The restoring force F increases toward the bottom faces of the recesses 13. In other words, although not shown, a reaction force received by the legs 22 from the inner walls of the recesses 13 increases toward the bottom faces thereof. As a result, as described below, a fixing force of the impact-absorbing member 2 to the bumper beam 1 is further enhanced.

Although not shown, the legs 22 formed of the pair of protrusions described above integrally extend with the impact-absorbing-member main body 21 in the vehicular width direction to have a rib shape.

As illustrated in FIG. 2A, the impact-absorbing member 2 assembled to the bumper beam 1 includes the protrusion 14 formed behind the face portions 15 of the recesses 13 as described above, to define a space 4 between the impact-absorbing-member main body 21 and the leading face 14a of the protrusion 14.

Note that a length of the space 4 in the front-and-rear direction may be set to about H/5 in relation to a crushing margin H in the front-and-rear direction of the impact-absorbing-member main body 21. A wall face on the front side of the space 4 is aligned in the up-and-down direction with the face portions 15.

The impact-absorbing member 2 as described above is formed of a compressively-deformable foamed elastic resin. As the foamed elastic resin, a known foamed elastic resin as an impact-absorbing material for bumpers may be used, and expanded polypropylene (EPP) and expanded polystyrene (EPS) are preferably used. The expanded polystyrene is particularly preferable not to cause a non-crushed portion to be left. The expanded polypropylene is particularly preferable to have high heat resistance.

Next, a description is given of the bumper face 3 (exterior member) illustrated in FIG. 1.

As illustrated in FIG. 1, the bumper face 3 extends in the vehicular width direction to cover the impact-absorbing member 2 ahead of the bumper beam 1.

The bumper face 3 in the present embodiment is assumed to be an injection molded product of a synthetic resin. Examples of the synthetic resin include, but are not limited to, polypropylene, ethylene-propylene rubber, and ethylene-propylene-diene rubber.

The bumper face 3 as described above may be fixed to a front fender, a front panel, or the like by snap-fitting by a clip, for example, however, a method of fixing the bumper face 3 to the vehicle body is not limited thereto.

Next, advantageous effects of the bumper structure S (impact-absorbing structure) according to the present embodiment are described.

In the bumper structure S according to the present embodiment, the recesses 13 of the bumper beam 1 (movable-body-side rigid member) each have a vertical width tapered toward the rear of the vehicle body (rear of the movable body).

According to the bumper structure S as described above, when the impact-absorbing member 2 (legs 22) is fitted into the recesses 13, an angular range in a pushing direction of the impact-absorbing member 2 (legs 22) into the recesses 13 is widened in accordance with an opening angle of the tapered shape. As a result, the impact-absorbing member 2 (legs 22) is pushed into the recesses 13 from multiple directions within the widened angular range in the pushing direction to be efficiently compressed within the recesses 13.

Thus, according to the bumper structure S, the reaction force from the inner walls of the recesses 13 caused by the restoring force F (see FIG. 3) of the compressed impact-absorbing member 2 (legs 22) is enhanced, resulting in effective prevention of the impact-absorbing member 2 (legs 22) from coming off from the recesses 13. Namely, according to the bumper structure S, which is different from a conventional bumper structure (for example, see JP 2004-322861 A) formed with the recess by the right-angled step portions, the fixing force of the impact-absorbing member 2 to the bumper beam 1 is further enhanced without interposing a fixing member such as an adhesive or a fastener.

In the bumper structure S according to the present embodiment, the recesses 13 each have a tapered shape. Thus, as described above, the reaction force from the inner walls of the recesses 13 caused by the restoring force F (see FIG. 3) of the impact-absorbing member 2 (legs 22) increases toward the bottom faces of the recesses 13. As a result, the bumper structure S has the fixing force, which is further enhanced, of the impact-absorbing member 2 to the bumper beam 1.

In the bumper structure S according to the present embodiment, the plurality of legs 22 fitted into one-to-one the plurality of recesses 13 arranged in the up-and-down direction of the bumper beam 1. Thus, the fixing force of the impact-absorbing member 2 to the bumper beam 1 is further enhanced as compared with, for example, the conventional bumper structure (for example, see JP 2004-322861 A) formed with a single recess.

In the bumper structure S according to the present embodiment, the bumper beam 1 includes the plurality of recesses 13 formed in the up-and-down direction and the protrusion 14 formed between the recesses 13 adjacent to each other.

The bumper structure S as described above includes the bumper beam 1 extending in the vehicular width direction to have a corrugated structure in the up-and-down direction, resulting in improvement in rigidity of the bumper beam 1 as a whole.

The impact-absorbing member 2 in the bumper structure S according to the present embodiment includes the legs 22 corresponding to the plurality of recesses 13 formed in the up-and-down direction of the bumper beam 1, so that the length in the up-and-down direction of the impact-absorbing-member main body 21 is consequently increased.

Thus, the bumper structure S according to the present embodiment secures a sufficient amount of wrap even for a pendulum barrier.

In the bumper beam 1 (movable-body-side rigid member) of the bumper structure S according to the present embodiment, the protrusion 14 is formed closer to the rear of the vehicle body (closer to the rear of the movable body) than the face portions 15 adjacent to an outside of the recesses 13.

According to the bumper structure S as described above, when the impact-absorbing member 2 receives a collision load, the impact-absorbing member 2 is efficiently compressed by a portion in front of the protrusion 14 to effectively absorb collision energy.

The bumper structure S according to the present embodiment includes the space 4 defined between the impact-absorbing member 2 and the leading face 14a of the protrusion 14 of the bumper beam 1 (movable-body-side rigid member).

According to the bumper structure S as described above, even a central portion in the up-and-down direction of the impact-absorbing-member main body 21 located in front of the protrusion 14 is displaced rearward as well as both ends in the up-and-down direction of the impact-absorbing-member main body 21 located in front of the recesses 13. Accordingly, in the bumper structure S, performance of collision-energy absorption of the impact-absorbing-member main body 21 located in front of the protrusion 14 is the same as that of the impact-absorbing-member main body 21 located in front of the recesses 13, resulting in improving the performance of collision-energy absorption of the impact-absorbing member 2 as a whole.

The embodiment of the present invention has been described above. The present invention, however, is not limited thereto, and thus may be carried out in various forms.

Figure 4:
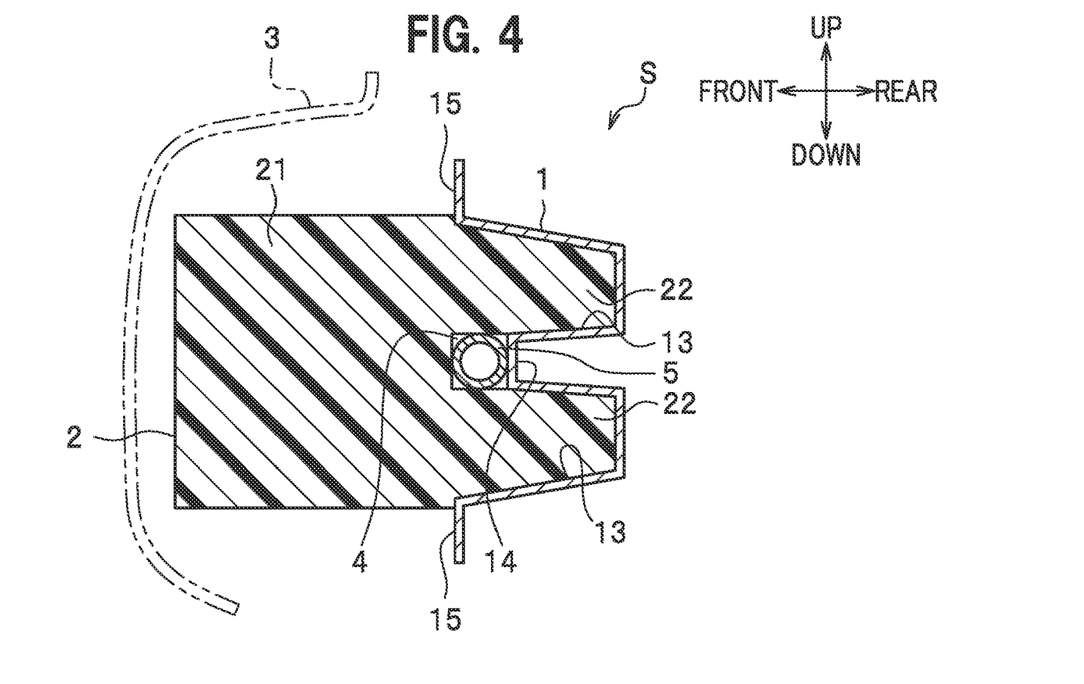
FIG. 4 is a cross-sectional view of an impact-absorbing structure according to a first modification.
Figure 5:
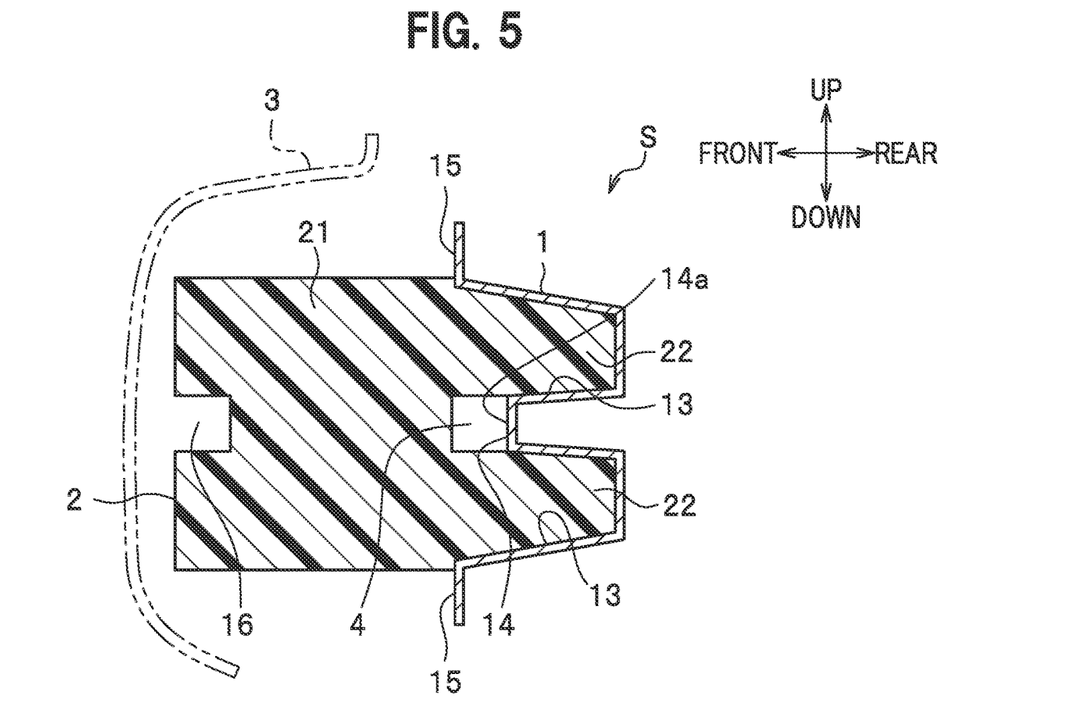
FIG. 5 is a cross-sectional view of an impact-absorbing structure according to a second modification.
Figure 6:
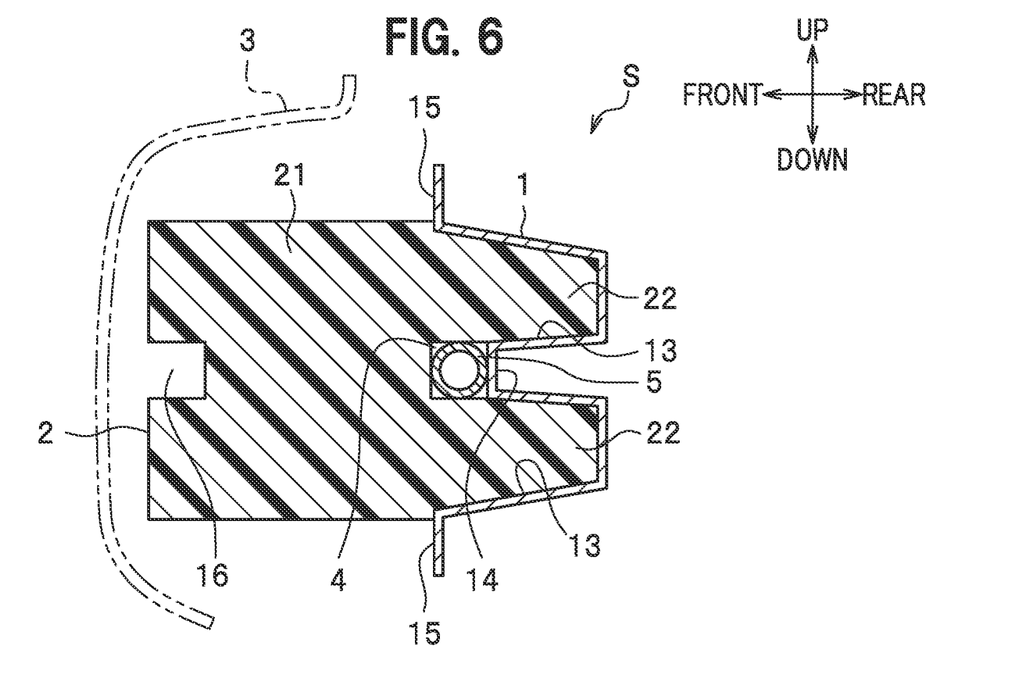
FIG. 6 is a cross-sectional view of an impact-absorbing structure according to a third modification.
Figure 7:
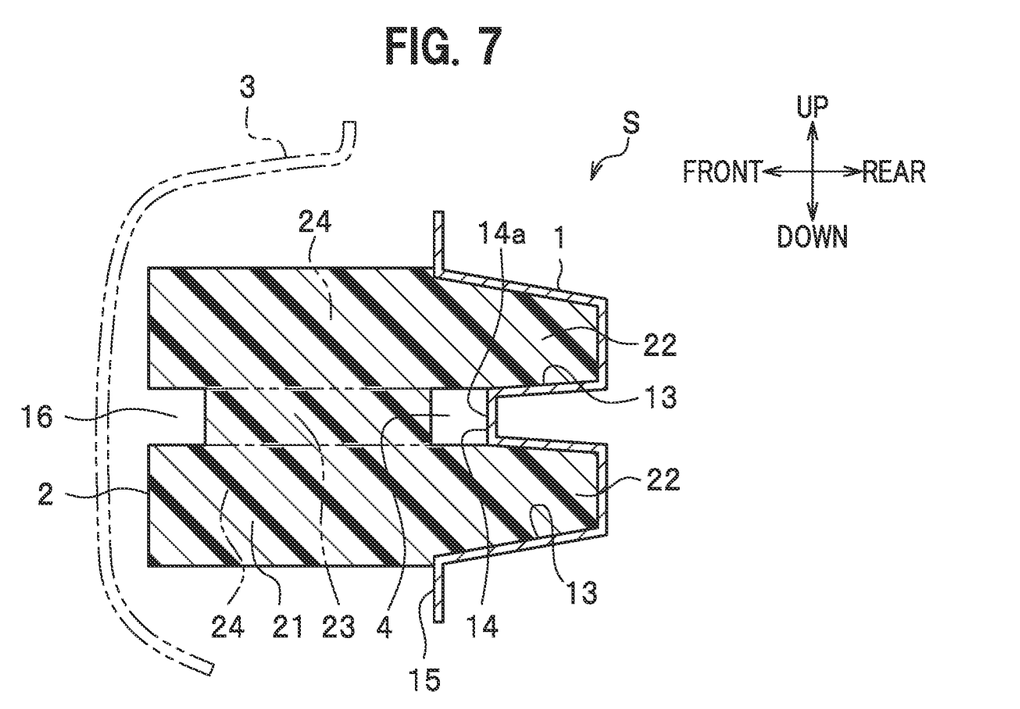
FIG. 7 is a cross-sectional view of an impact-absorbing structure according to a fourth modification.

FIG. 4 is a cross-sectional view of the bumper structure S (impact-absorbing structure) according to a first modification. FIG. 5 is a cross-sectional view of the bumper structure S (impact-absorbing structure) according to a second modification. FIG. 6 is a cross-sectional view of the bumper structure S (impact-absorbing structure) according to a third modification. FIG. 7 is a cross-sectional view of the bumper structure S (impact-absorbing structure) according to a fourth modification. Note that, in the modifications illustrated in FIGS. 4 to 7, the same components as those of the above embodiment are denoted with the same reference signs, and thus a detailed description thereof is not given.

As illustrated in FIG. 4, the bumper structure S according to the first modification includes the tube 5 for detecting a collision-load disposed within the space 4 of the bumper structure S according to the embodiment described above. Note that the tube 5 corresponds to a "pressure sensing member of a pressure detector" in the appended claims.

The tube 5 in the bumper structure S extends in the vehicular width direction along the impact-absorbing member 2, and pressure sensors (not shown) of the pressure detector (not shown) faces inside both ends of the tube 5.

A pressure-transmission medium is filled almost entirely in the tube 5 as described above in a length direction thereof. The pressure sensors detect variations in pressure within the tube 5 to transmit a detection signal to an arithmetic processing unit such as a central processing unit (CPU) included in the pressure detector.

In the bumper structure S according to the first modification, as in the case of the bumper structure S (see FIG. 2A) according to the above embodiment, the impact-absorbing-member main body 21 located in front of the protrusion 14 is retracted with high sensitivity in response to a collision load. As a result, the tube 5 in contact with the impact-absorbing-member main body 21 transmits, with high sensitivity, variations in pressure to the pressure sensors (not shown) in response to a collision load.

Next, a description is given of the bumper structure S (see FIG. 5) according to the second modification.

As illustrated in FIG. 5, in the bumper structure S according to the second modification, the impact-absorbing-member main body 21 ("a portion corresponding to the protrusion" in the appended claims) located in front of the protrusion 14, specifically in front of the leading face 14*a* of the protrusion 14 is partially recessed toward the rear of the vehicle body (the rear of the movable body) on a side closer to the bumper face 3 (closer to the exterior member), to have a recess 16 at a front end of the impact-absorbing-member main body 21.

In the bumper structure S according to the second modification, at an initial stage of contact by a collision object with the bumper structure S, a bottom face of the recess 16 is not compressed by a collision load. As a result, in the bumper structure S, when the collision load is received by the bottom face of the recess 16 in a course following the initial stage of contact, insufficient retraction stroke of the impact-absorbing-member main body 21, located in front of the protrusion 14, is prevented. Thus, the bumper structure S is excellent in performance of collision-energy absorption.

Next, a description is given of the bumper structure S (see FIG. 6) according to the third modification.

As illustrated in FIG. 6, the bumper structure S according to the third modification includes the tube 5 (pressure sensing member) for detecting a collision-load is disposed within the space 4 of the bumper structure S according to the second modification (see FIG. 5).

In the bumper structure S as described above according to the third modification, as in the case of the bumper structure S according to the second modification, at an initial stage of contact by a collision object with the bumper structure S, the bottom face of the recess 16 is not compressed by a collision load. Therefore, in the bumper structure S, a collision load at the initial stage of contact by the collision object is not transmitted to the tube 5 (pressure sensing member). As a result, the bumper structure S prevents excessive sensing of the collision load at a time of light collision.

Next, a description is given of the bumper structure S (see FIG. 7) according to the fourth modification.

As illustrated in FIG. 7, in the bumper structure S according to the fourth modification, the impact-absorbing member 2 has a portion 23 and other portions 24. The portion 23 corresponding to the protrusion 14, specifically, the leading face 14*a* of the protrusion 14 in the front-and-rear direction of the vehicle body ("in a front-and-rear direction of the movable body" in the appended claims) has different rigidity from the other portions 24 of the impact-absorbing member 2.

Specifically, the portion 23 has lower rigidity than the portions 24. Namely, for the foamed elastic resin forming the impact-absorbing member 2, the portion 23 has a larger foaming ratio than the other portions 24.

The impact-absorbing member 2 as described above, having a partially different foaming ratio, is formed in such a manner that a content ratio of a foaming agent in a resin base material injected into cavities for forming the other portions 24 is made smaller than a content ratio of the foaming agent in the resin base material injected into a cavity for forming the portion 23, for the resin base material injected into a predetermined mold for molding the impact-absorbing member 2.

In the bumper structure S as above according to the fourth modification, the portion 23 as a center in the up-and-down direction of the impact-absorbing member 2 has lower rigidity than the other portions 24 having the portion 23 therebetween in the up-and-down direction. Thus, when the impact-absorbing member 2 receives a collision load, retracting stroke is sufficiently gained at the center in the up-and down direction of the impact-absorbing member 2. Thus, the bumper structure S is excellent in performance of collision-energy absorption.

In the bumper structure S as above according to the fourth modification, conversely, the portion 23 may be set to have higher rigidity than the other portions 24.

The impact-absorbing member 2 as above of the bumper structure S is formed in such a manner that the content ratio of the foaming agent in a resin base material injected into the cavity for forming the other portion 23 is made smaller than the content ratio of the foaming agent in the resin base material injected into the cavities for forming the other portions 24.

According to the bumper structure S as described above, as in the case of the bumper structure S (see FIG. 5) according to the second modification, at an initial stage of contact with a collision object, the other portions 24 of the impact-absorbing member 2 receive a collision load to efficiently absorb collision energy. Further, according to the bumper structure S, as in the case of the bumper structure S (see FIG. 6) according to the third modification, if the tube 5 (not shown in FIG. 7) is arranged in the space 4, excessive sensing of a collision load at a time of light collision is prevented.

In the bumper structure S, when the collision load is received by the bottom face of the recess 16 in a course following the initial stage of contact, the portion 23 having high rigidity efficiently transmits the collision load to the tube 5 (see FIG. 6) while being given with priority to retracting rather than crushing. As a result, the bumper structure S enables detection of the collision load earlier than that including the portion 23 having low rigidity.

What is claimed is:

1. An impact-absorbing structure comprising:
an exterior member for a movable body;
a movable-body-side rigid member; and
an impact-absorbing member interposed to be compressively deformed between the exterior member and the movable-body-side rigid member,
wherein the movable-body-side rigid member, in an up and-down direction of the movable-body-side rigid member, includes:
a plurality of recesses recessed toward the movable body; and
a protrusion protruding forward the movable body to be formed between the plurality of recesses,
the protrusion has a leading face flat in an up-and-down direction on a front side of the protrusion,
the plurality of recesses each have a vertical width gradually tapering toward the movable body,
the impact-absorbing member is fitted into at least two of the plurality of recesses,
the movable-body-side rigid member includes a face portion outside the recess formed at an outermost portion among the plurality of recesses in the up-and-down direction to face in a front-and-rear direction of the movable body, the face portion being adjacent to the recess,
a space is defined between the impact-absorbing member and the leading face of the protrusion, and
a wall face on a front side of the space is aligned in the up-and-down direction with the face portion.

2. The impact-absorbing structure according to claim 1, wherein the protrusion is formed closer to the movable body than the face portion.

3. The impact-absorbing structure according to claim 1, wherein a pressure sensing member of a pressure detector is disposed in the space.

4. The impact-absorbing structure according to claim 1, wherein the impact-absorbing member has a portion, corresponding to the leading face of the protrusion, on a side closer to the exterior member and being recessed toward the movable body.

5. The impact-absorbing structure according to claim 1, wherein the impact-absorbing member has a portion corresponding to the protrusion extending in the front-and-rear direction of the movable body and having lower rigidity than another portion of the impact-absorbing member.

6. The impact-absorbing structure according to claim 3, wherein the impact-absorbing member has a portion corresponding to the leading face of the protrusion extending in the front-and-rear direction of the movable body and having higher rigidity than another portion of the impact-absorbing member.

7. An impact-absorbing structure comprising:
an exterior member for a movable body;
a movable-body-side rigid member; and
an impact-absorbing member interposed to be compressively deformed between the exterior member and the movable-body-side rigid member,
wherein the movable-body-side rigid member, in an up-and-down direction of the movable-body-side rigid member, includes:
a plurality of recesses recessed toward the movable body; and
a protrusion protruding forward the movable body to be formed between the plurality of recesses,
the plurality of recesses each have a vertical width gradually tapering toward the movable body,
the impact-absorbing member is fitted into at least two of the plurality of recesses,
the impact-absorbing member has a portion, corresponding to a leading face of the protrusion, on a side closer to the exterior member and being recessed toward the movable body, and
the impact-absorbing member has a portion corresponding to the leading face of the protrusion extending in a front-and-rear direction of the movable body and having higher rigidity than another portion of the impact-absorbing member.

* * * * *